United States Patent
Liu

(10) Patent No.: US 6,639,816 B2
(45) Date of Patent: Oct. 28, 2003

(54) POWER SUPPLY SYSTEM WITH AC REDUNDANT POWER SOURCES AND SAFETY DEVICE

(75) Inventor: Chu-Kuang Liu, Pingjen (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

(21) Appl. No.: 09/948,752

(22) Filed: Sep. 6, 2001

(65) Prior Publication Data

US 2002/0145895 A1 Oct. 10, 2002

(30) Foreign Application Priority Data

Apr. 6, 2001 (TW) .................................. 90108364 A

(51) Int. Cl.[7] .............................................. H02M 7/23
(52) U.S. Cl. .............................. 363/65; 363/67; 363/69; 363/70
(58) Field of Search ............................ 363/65, 67, 69, 363/70

(56) References Cited

U.S. PATENT DOCUMENTS 5,319,536 A * 6/1994 Malik .......................... 363/65
5,398,182 A * 3/1995 Crosby ......................... 363/89
5,796,601 A * 8/1998 Yamamoto ..................... 363/84
5,886,889 A * 3/1999 Escallier ....................... 363/69

* cited by examiner

Primary Examiner—Bao Q. Vu
(74) Attorney, Agent, or Firm—Alston & Bird LLP

(57) ABSTRACT

A power supply system having AC redundant power supplies and a safety device is constituted by a plurality of AC power sources, each of the AC power sources is directly coupled in series with a corresponding one of the DC power supplies which are connected in parallel for outputting a voltage, for providing an AC voltage to operate the corresponding one of the DC power supplies, a control circuit coupled between the AC power sources and the DC power supply which is not directly coupled in series with a corresponding one of AC power sources for creating a conductive path to transfer the AC voltage from one of the AC power sources to the DC power supply which is not directly coupled in series with a corresponding one of AC power sources when the other AC power source is abnormally interrupted in supplying an AC voltage to operate the DC power supplies, and a safe device for preventing the AC power sources from getting short-circuited caused by the inlet of the power supply system being plugged into the outlet of the AC power source in an inverse direction.

11 Claims, 3 Drawing Sheets

POWER SUPPLY SYSTEM WITH AC REDUNDANT POWER SOURCES AND SAFETY DEVICE

FIELD OF THE INVENTION

The present invention is related to a power supply system, and more particularly, to a power supply system with AC redundant power sources and a safety device to provide auxiliary AC electric power to operate the DC power supplies of the power supply system when the AC power source in operation is abnormally interrupted, and to provide a safety device to prevent the AC power sources of the power supply system from getting short-circuited caused by the inlet of the power supply system being plugged into the outlet of the AC power source in an inverse direction.

BACKGROUND OF THE INVENTION

The contemporary power supply system with DC (direct current) redundant power supplies is depicted in FIG. 1. The power supply system with DC redundant power supplies includes a single AC (alternating current) power source 11 provided to supply AC electric power to operate a plurality of DC power supplies 12, 13, and 14 which are connected in parallel for outputting combined DC electric power. The configuration of the contemporary power supply system with DC redundant power supplies is advantageous over the situation that if one of DC power supplies which is designated to supply DC electric power in normal operation is failed, the other DC power supplies can supply DC electric power without interruption.

Despite the advantages of the contemporary power supply system, assuming that the single AC power source 11 is abnormally interrupted in supplying AC electric power to operate the DC power supplies 12, 13, and 14, the operation of the whole power supply system will halt and the power supply system will come into power outage. As a rule, an ideal power supply system must includes not only the functionality of providing auxiliary DC power supplies, but also includes the functionality of providing auxiliary AC power sources to supply AC electric power to operate the DC power supplies in case the AC power source in operation is abnormally interrupted.

At present, the implementation of the outlet of the AC power source is roughly falls into a two hole outlet and a three hole outlet, and most of the outlet of the AC power source is provided with a foolproof contrivance. The foolproof contrivance is used to allow the inlet of the power supply system to be able to plug into the outlet of the AC power source in a specific direction, in order that the inlet of the power supply system can acquire a fixed live line and an earth line from the AC power source. Nonetheless, in some situations the inlet of the power supply system can be plugged into the outlet of the AC power source in an inverse direction, for example, the outlet of the AC power source is not provided with a foolproof contrivance. This would cause the AC power source of the power supply system short-circuited.

It is inclined to provide a power system with AC redundant power sources and a safety device, to assure that the power system can sustain supplying electric power in event that the AC power source in operation is abnormally interrupted, and prevent the AC power sources from getting short-circuited caused by the inlet of the power supply system being plugged into the outlet of the AC power source of the power supply system in an inverse direction.

SUMMARY OF THE INVENTION

According to a preferred embodiment of the present invention, the power supply system is arranged to include three DC power supplies which are connected in parallel for outputting a combined DC power output, two AC power sources, each of the AC power sources is directly coupled in series with a corresponding one of the DC power supplies to provide an AC voltage to operate the corresponding one of DC power supplies, a control circuit coupled between the AC power sources and the DC power supply which is not directly coupled in series with a corresponding one of AC power sources for creating a conductive path to transfer the AC voltage from one of the AC power sources to the DC power supply which is not directly coupled in series with a corresponding one of AC power sources when the other AC power source is abnormally interrupted in supplying an AC voltage to operate the DC power supplies, wherein the control circuit includes a safety device for preventing the AC power sources from getting short-circuited.

The control circuit may further comprises a first switch circuit coupled in series with one of the AC power sources for receiving an AC voltage from one of the AC power sources and transmitting the AC voltage to the safety device, a second switch circuit coupled in series with one of the AC power sources for receiving an AC voltage from one of the AC power source and transmitting the AC voltage to the safety device, and a voltage transfer circuit which is coupled with the safety device and the DC power supply which is not directly coupled in series with one of the AC power sources for alternatively creating a conductive path in response to a control signal to provide either the AC voltage being transferred from the first switch circuit or the AC voltage being transferred from the second switch circuit to the DC power supply coupled therewith.

Both of the above-described first switch circuit and the second switch circuit are implemented by two serially-connected relays, and the voltage transfer circuit is implemented by two two-to-one relays. Both of the first switch circuit and the second switch circuit are operable to isolate the interrupted power source from the power source in operation to protect one from getting electric shock when one touches the interrupted AC power source. The above-mentioned safety device may comprise a first full wave rectifier coupled with the first switch circuit and one of the two-to-one relay of the voltage transfer circuit for rectifying the AC voltage being transferred from the first switch circuit and a second full wave rectifier coupled with the second switch circuit and the other one of the two-to-one relay of the voltage transfer circuit for rectifying the AC voltage being transferred from the second switch circuit. Moreover, the control circuit for creating a conductive path for transferring the AC voltage from one of the AC power sources to the DC power supply which is not directly coupled in series with the AC power sources further includes a microprocessor, which persistently detects the AC voltages from each of the AC power sources and generate a control signal to drive the voltage transfer circuit to create a conductive path to transfer an AC voltage from one of the AC power sources to the DC power supply which is coupled with a corresponding voltage transfer circuit when the other AC power source is interrupted in supplying an AC voltage to operate the DC power supplies. When the interrupted AC power source becomes normal, the microprocessor can generate a control signal to restore the conductive path between the interrupted AC power and the corresponding DC power supply.

Broadly speaking, the number of the DC power supplies of the power supply system in accordance with the present invention can be indicated in terms of 2N+1, wherein N is a positive integer number, and the number of the voltage transfer circuits should be identical to the number of the DC power supplies each of which is coupled with a corresponding voltage transfer circuit.

Now the foregoing and other features and advantages of the present invention will be more clearly understood through the following descriptions with reference to the drawings, wherein:

DETAILED DESCRIPTION OF THE PREFERRED EMBODIMENT

Figure 1:
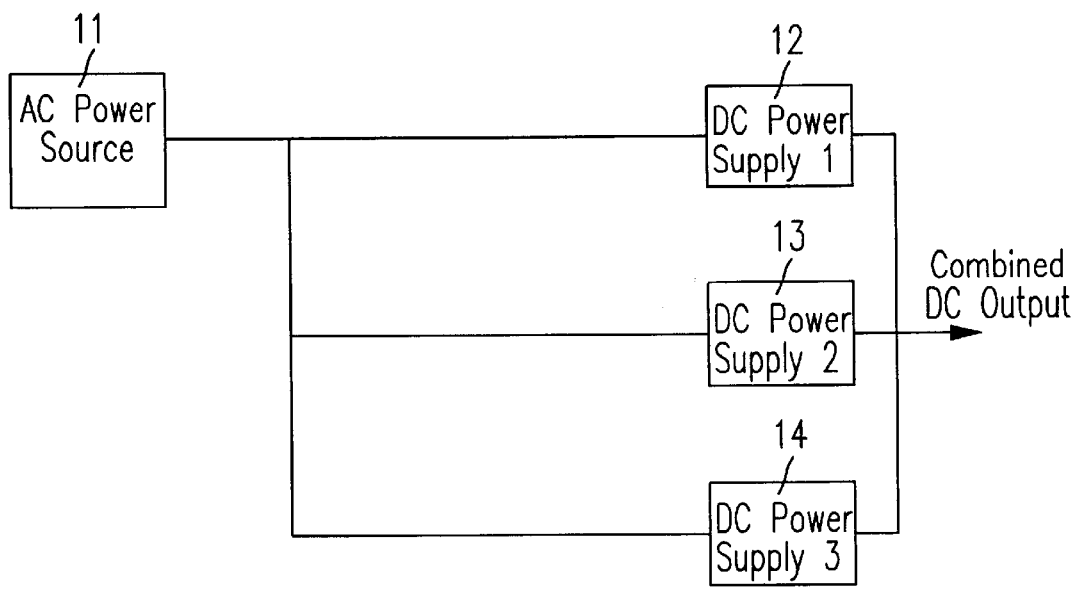
FIG. 1 schematically depicts a circuit block diagram of prior art power supply system with redundant DC power supplies.
Figure 2:
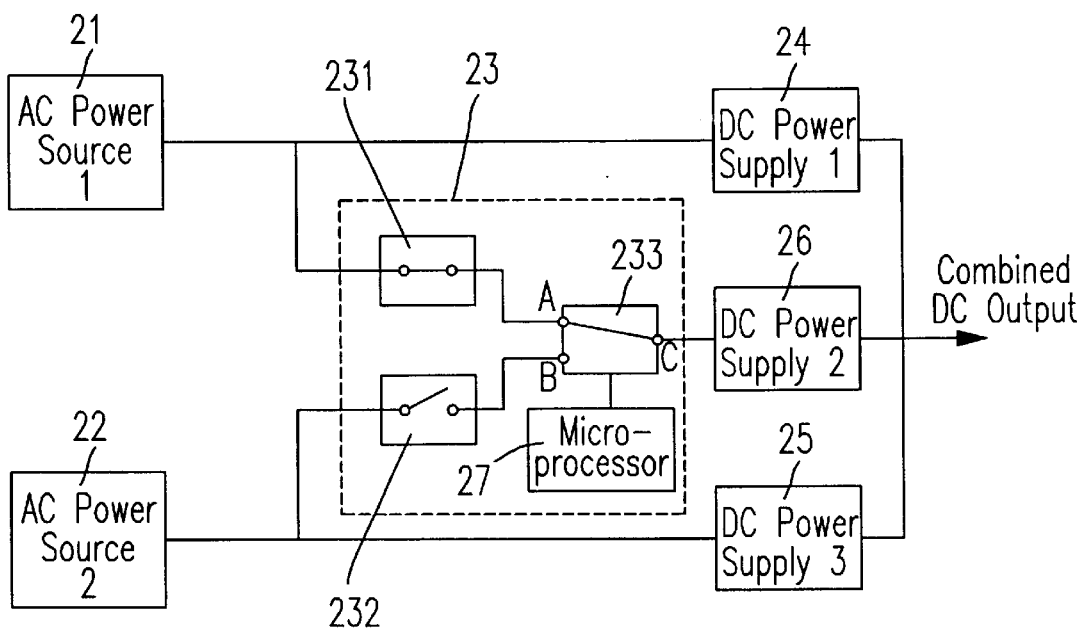
FIG. 2 is a plane view showing the power supply system with AC redundant power sources in normal operation according to a preferred embodiment of the present invention.

A preferred embodiment of the present invention will be illustrated by the following description and the accompanying drawings. Referring to FIG. 2, the power supply system of the present invention comprehends two AC power sources 21 and 22 respectively directly coupled in series with a first DC power supply 24 and a third DC power supply 25 to provide AC electric power to respectively operate the first DC power supply 24 and the third DC power supply 25. A control circuit 23, which is made up of a first switch circuit 231, a second switch circuit 232, and a voltage transfer circuit 233, is coupled between the AC power sources 21, 22 and a second DC power supply 26. The AC power sources 21 and 22 are also coupled in series with the first switch circuit 231 and the second switch circuit 232 of the control circuit 23, respectively. Both of the first switch circuit 231 and the second switch circuit 232 are coupled with the second DC power supply 26 through the voltage transfer circuit 233. As depicted in FIG. 2, both of the first relay circuit 231 and the second relay circuit 232 are embodied in a one-to-one relay element, and the voltage transfer circuit 233 is embodied in a two-to-one relay element. The DC power supplies 24, 25, 26 are connected in parallel and provide a combined DC electric power output to drive a common load (which is not shown in the drawings). In event that an abnormality is occurred to one of the DC power supply such that it can not supply DC electric power to drive the load, the other DC power supplies acts as auxiliary power supply to supply DC electric power to the load.

The control circuit 23 is configured to create a conductive path to transfer the AC voltage provided by either the AC power source 21 or the AC power source 22 to operate the second DC power supply 26 which is not directly coupled in series with the AC power sources 21 and 22. The first switch circuit 231 can be driven by the first AC power source 21 or the first DC power supply 24, and the second switch circuit 232 also can be driven by the second AC power source 22 or the third DC power supply 25. The one-to-one relay element of the first switch circuit 231 is driven by either the AC voltage from the first AC power source 21 or the trigger voltage of the first DC power supply 24 in such a way that if the voltage applied to the first switch circuit 231 is sufficient to turn on the one-to-one relay element of the first switch circuit 231, the AC voltage from the AC power source 21 can be transferred to the two-to-one relay element of the voltage transfer circuit 233. In an analogous manner, the one-to-one relay element of the second switch circuit 232 is driven by either the AC voltage of the second AC power source 22 or the trigger voltage of the third DC power supply 25 in such a way that if the voltage applied to the second switch circuit 232 is sufficient to turn on the second switch circuit 232, the AC voltage from the AC power source 22 can be transferred to the two-to-one relay element of the voltage transfer circuit 233. With regard to the operation of the voltage transfer circuit 233, it is controlled by the microprocessor 27. The operation of the voltage transfer circuit 23 will be described in detail in the following.

Still referring to FIG. 2, in normal operation, the AC power source 21 is set to operate the DC power supplies 24 and 26, and the AC power source 22 is set to operate the DC power supply 25. As indicated in FIG. 2, the first DC power supply 24 receives the AC voltage from the first AC power source 21 and outputs a voltage, and the first switch circuit 231 will be driven o turn on, whereby transfers the AC voltage from the first AC power source 21 to the two-to-one relay element of the voltage transfer circuit 233 which will be switched to turn on at position A. The microprocessor 27 is used to keep on monitoring the AC voltages of each of the AC power sources 21 and 22, and generates a control signal to drive the voltage transfer circuit 233 to be switched on position A when the zero-crossing point of the input voltage from the first AC power source 21 is detected. Then the voltage transfer circuit 233 will receive the AC voltage from the first AC power source 21 through the first switch circuit 231, and the AC voltage from the first AC power source 21 will be transferred to the second DC power supply 26. A conductive path is then created between the AC power source 21 and the second DC power supply 26 by means of the switch operation of the first switch circuit 231 and the voltage transfer circuit 233, regardless of the state of the second switch circuit 232. The output voltage of the whole power supply system is determined by the parallel connection of the three parallel DC power supplies 24, 25, and 26.

Figure 3:
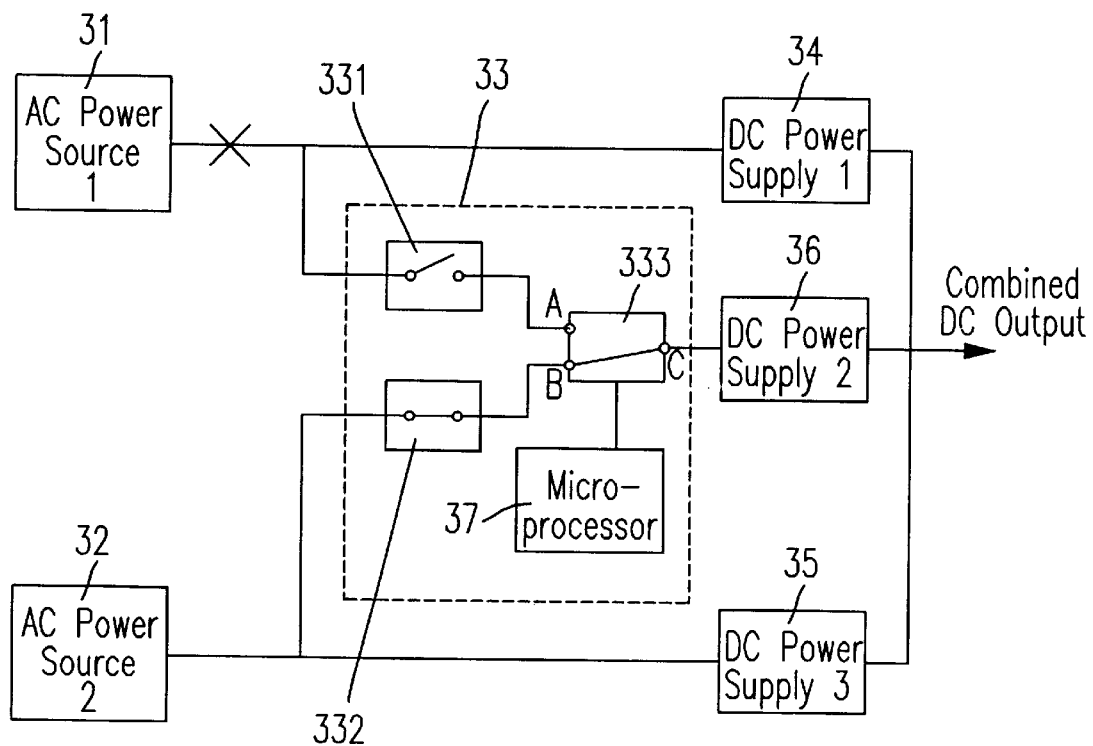
FIG. 3 illustrates the block diagram of the power supply system with AC redundant power sources according to a preferred embodiment of the present invention, in which the AC power source in operation is interrupted.

Turning now to FIG. 3, when the first AC power source 31 is interrupted to supply AC electric power to operate the first DC power supply 34, the first DC power supply 34 will not receive the AC voltage from the first AC power source 31. The first switch circuit 331 will automatically turn off and cut off the conductive path between the first AC powers source 31 and the second DC power supply 36. At that instant, the second switch circuit 32 which is driven either by the second AC power source 32 or the third DC power supply 35 will turn on. In the mean time, the microprocessor 37 generates a control signal to drive the voltage transfer circuit 333 to be switched to turn on at position B when the zero-crossing point of the AC voltage from the second AC voltage source 32 is detected. Thereby the second AC power source 32 acts as an AC redundant power source, and an alternative conductive path is created to transfer the AC voltage from the second AC power source 32 to the second DC power supply 36 through the switch operation of the second switch circuit 332 and the voltage transfer circuit 333. Moreover, the interrupted AC power source 31 is still monitored by the microprocessor 37 such that when the interrupted AC power source 31 becomes normal, the microprocessor 37 can generate a control signal to restore the conductive path between the first AC powers source 31 and the DC power supplies 34 and 36. By controlling these switch circuits to change their state at the instant that the AC power source in operation is interrupted in supplying AC voltage to operate the DC power supplies, an conductive path is created such that the AC power source acting as the redundant power source can supply its AC voltage to operate the DC power supply which is not directly coupled with the AC power sources through the conductive path.

As mentioned above, the state of the voltage transfer circuit 333 is switched in accordance with the zero-crossing point of the two AC voltages from the AC power sources, in order that the sudden inrush current can be reduced and the spark come about during the switch operation can be avoided. Moreover, in order to precisely control the AC redundant power source to supply AC electric power instantaneously upon the time the AC power source in operation is interrupted, the microprocessor 37 is required to be incorporated into the control circuit 33 to monitor the AC voltages of each of the AC power sources 31 and 32 and to detect that the zero-crossing point of the AC voltages from the AC power source 31 and 32, thereby generating a control signal to drive the voltage transfer circuit 333 to switch the turn-on position for creating the conductive path between the AC redundant power source and the DC power supply which is not directly coupled in series with the AC power sources 31 and 32. In addition, both the first switch circuit 331 and the second switch circuit 332 are operable to isolate the interrupted AC power source from the AC power source in operation to prevent one from getting electric shock when one touches the interrupted AC power source. The AC power sources of the power supply system of the present invention can be either a domestic power source or an uninterruptible power system, depending on the design specification.

Figure 4:
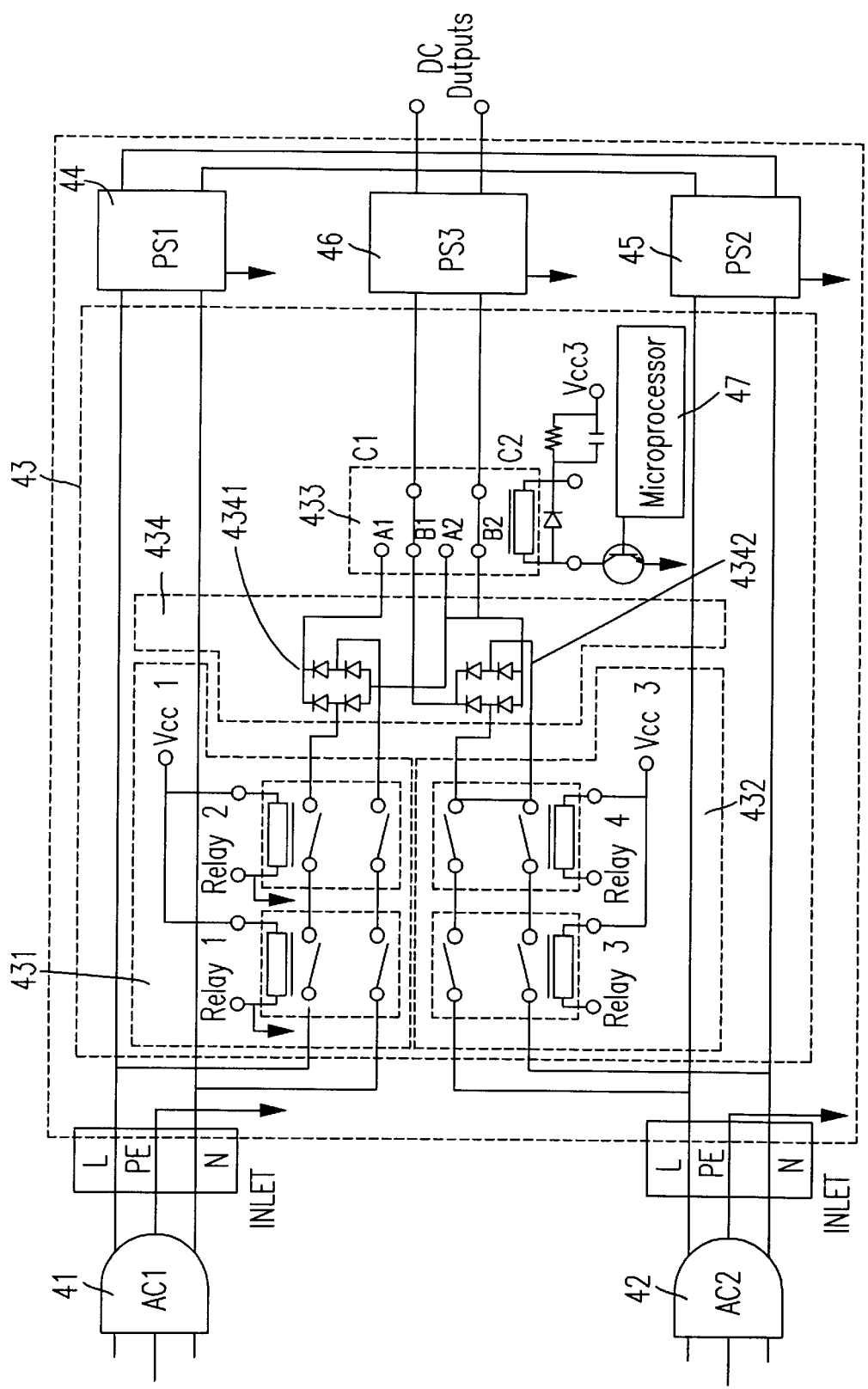
FIG. 4 is a detailed circuit block diagram of the power supply system with AC redundant power sources and safety device according to a first embodiment of the present invention.

FIG. 4 shows a detailed circuit block diagram of the power supply system according to a first preferred embodiment. In FIG. 4, a safety device 434 which includes two full wave rectifiers 4341 and 4342, is provided in the control circuit 43 to be coupled with the first switch circuit 431, the second switch circuit 432, and the voltage transfer circuit 433. The first switch circuit 431 comprises two serially-connected one-to-one relays Relay 1 and Relay 2, and the second switch circuit 432 also comprises two serially-connected one-to-one relays Relay 3 and Relay 4. The voltage transfer circuit 433 comprises two two-to-one relays, each of which is coupled with a full wave rectifier.

The AC voltage transferred from the first switch circuit 431 is first rectified by the full wave rectifier 4341, and then the rectified AC voltage is transferred to a corresponding two-to-one relay of the voltage transfer circuit 433. Similarly, the AC voltage transferred from the second switch circuit 432 is first rectified by the full wave rectifier 4342, and then the rectified AC voltage is transferred to a corresponding two-to-one relay of the voltage transfer circuit 433. Because the AC voltages from each of the AC power sources AC1 and AC2 are processed by full wave rectification before it is transferred to the relays of the voltage transfer circuit 433, even though the corresponding input terminals of the two relays of the voltage transfer circuit 433, for example, A1 and A2, are quite close, the AC voltages outputted from the live line (which is indicated by L) and the earth line (which is indicated by PE) of the AC power sources AC1 and AC2 will not cause the AC power sources AC1 and AC2 to be temporarily short-circuited during the control module switches between the two operating AC sources on condition that the inlet is plugged into the outlet of the AC power sources in an inverse direction. Additionally, the first switch circuit 431 can be functioned as a protection device for preventing a man from getting a shock when a man touches the interrupted AC power source 41 or 42. Similarly, the second switch circuit 432 has the same function as the first switch circuit 431 if the AC power source 42 is interrupted.

In this illustrative embodiment, the number of the DC power supplies is 3. However, it is intended to indicate that the same can be applied to 2N+1 DC power supplies, where N is a positive integer number. For example, the power supply system of the present invention can be made up of two AC power sources and five DC power supplies, with a control circuit including a first switch circuit and a second switch circuit and three voltage transfer circuits each of which is coupled with one of the DC power supplies which is not directly coupled in series with the AC power sources. Each of the three voltage transfer circuits creates a conductive path to transfer the AC voltage from the redundant AC power source to operate the DC power supply in which the voltage transfer circuit coupled therewith. As can be known from the above discussions, the number of the voltage transfer circuit should be identical to the number of the DC power supplies which are not directly coupled in series with the AC power sources, in order that each of the voltage transfer circuit is employed to create a conductive path for the corresponding DC power supply. It is to be emphasized that power supply system with two power sources and 2N+1 (where N is a positive integer number) power supplies is also encompassed within the possible circuit configuration of the present invention.

Although the present invention has been described and illustrated in detail, it is to be clearly understood that the same is by the way of illustration and example only and is not to be taken by way of limitation, the spirit and scope of the present invention being limited only by the terms of the appended claims.

I claim:
1. A power supply system comprising:
 a plurality of power supplies which are connected in parallel for outputting a voltage;
 a plurality of power sources, each of said power sources is directly coupled in series with a corresponding one of said power supplies to provide a voltage to operate said corresponding one of said power supplies; and
 a control circuit coupled between said power sources and the power supplies except those said respective power supplies and power sources which are directly mutually coupled in series, for creating a conductive path to transfer a voltage from one of said power sources except those which are interrupted in providing voltages to operate said power supplies;
 wherein said control circuit comprises:
  a safety device for preventing said power sources from getting short circuited;
  one of a plurality of switch circuits coupled in series with one of said power sources and said safety device for receiving a voltage from said one of said power sources and transferring to said safety device; and
  a voltage transfer circuit coupled between said safety device and said one of said power supplies except those said respective power supplies and power sources which are directly mutually coupled in series, and configured to be switched near a zero-crossing point of the voltages from said power sources, for alternatively creating a conductive path in response to a control signal to provide the voltage being transferred from one of said switch circuits to said one of said power supplies.

2. The power supply system as claimed in claim 1, wherein said power supplies comprises 2N+1 direct current (DC) power supplies, and wherein N is a positive integer number.

3. The power supply system as claimed in claim 1, wherein said power sources comprises two alternating current (AC) power sources.

4. The power supply system as claimed in claim 1, wherein said plurality of switch circuits further comprises:

a first switch circuit coupled in series with one of said power sources and said safety device for receiving a voltage from said one of said power sources and transferring said voltage to said safety device; and a second switch circuit coupled in series with one of said power sources and said safety device for receiving a voltage from said one of said power sources and transferring said voltage to said safety device.

5. The power supply system as claimed in claim 4, wherein said first switch circuit comprises two serially-connected one-to-one relays.

6. The power supply system as claimed in claim 4, wherein said second switch circuit comprises two serially-connected one-to-one relays.

7. The power supply system as claimed in claim 4, wherein each of said voltage transfer circuits comprises two two-to-one relays.

8. The power supply system as claimed in claim 4, wherein the number of said plurality of voltage transfer circuits is identical to the number of the power supplies excluded from the power supplies which are directly coupled in series with said plurality of power sources.

9. The power supply system as claimed in claim 4, wherein both of said first switch circuit and said second switch circuit are operable to isolate the power sources which are interrupted in supplying voltages to operate said power supplies from the power sources which are supplying voltages to operate said power supplies.

10. The power supply system as claimed in claim 7, wherein said safety device comprises a first full wave rectifier coupled with said first switch circuit and one of said two-to-one relays of one of said voltage transfer circuits for rectifying said voltage being transferred from said first switch circuit, and a second full wave rectifier coupled with said second switch circuit and one of said two-to-one relays of one of said voltage transfer circuits for rectifying said voltage being transferred from said second switch circuit.

11. The power supply system as claimed in claim 4, wherein said control circuit further comprises:

a microprocessor which persistently detects the voltages from each of said power sources and generate a control signal to drive each of said voltage transfer circuits to create a conductive path to transfer a voltage from one of said plurality of power sources to the power supply which is coupled with a corresponding one of said voltage transfer circuits.

* * * * *